US011763406B2

(12) United States Patent
Rajkhowa et al.

(10) Patent No.: US 11,763,406 B2
(45) Date of Patent: Sep. 19, 2023

(54) METHOD AND APPARATUS FOR DELIVERY ORDER FEE DETERMINATION AND ASSIGNMENT

(71) Applicant: Wal-Mart Apollo, LLC, Bentonville, AR (US)

(72) Inventors: Pratosh Deepak Rajkhowa, Sunnyvale, CA (US); Manish Gupta, Sunnyvale, CA (US); Puneet Srivastava, Fremont, CA (US); Sairanjit Polepeddi, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 165 days.

(21) Appl. No.: 16/396,394

(22) Filed: Apr. 26, 2019

(65) Prior Publication Data

US 2020/0342558 A1 Oct. 29, 2020

(51) Int. Cl.
*G06Q 50/28* (2012.01)
*G06Q 10/1093* (2023.01)
*G06Q 10/0635* (2023.01)

(52) U.S. Cl.
CPC ......... *G06Q 50/28* (2013.01); *G06Q 10/0635* (2013.01); *G06Q 10/1097* (2013.01)

(58) Field of Classification Search
CPC ............ G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

| | | | |
|---|---|---|---|
| 9,563,864 B2 * | 2/2017 | Cantor | G06Q 10/063114 |
| 10,133,995 B1 * | 11/2018 | Reiss | G06Q 10/063114 |
| 10,552,773 B1 * | 2/2020 | Shah | G06N 7/005 |
| 2002/0116318 A1 * | 8/2002 | Thomas | G06Q 10/08 705/37 |
| 2013/0159059 A1 * | 6/2013 | Malov | G06Q 30/02 705/7.35 |

(Continued)

OTHER PUBLICATIONS

Nourinejad, Mehdi, and Matthew J. Roorda. "Agent based model for dynamic ridesharing." Transportation Research Part C: Emerging Technologies 64 (2016): 117-132. (Year: 2016).*

*Primary Examiner* — Emmett K. Walsh
(74) *Attorney, Agent, or Firm* — Morgan, Lewis & Bockius LLP; Manita Rawat

(57) ABSTRACT

This application relates to apparatus and methods for determining delivery prices for, and the assigning of, order deliveries. In some examples, a computing device may obtain order data identifying an order for delivery. The computing device may transmit a request to deliver the order for a first price to a first driver. The computing device may determine that a response to the request has not been received, and obtain risk values corresponding to identified delivery request acceptance risk factors. The risk factors may include location based risk factors, delivery time risk factors, driver supply risk factors, and time deadline risk factors. The computing device may determine a second price based on the first price and the risk values by executing one or more algorithms. The computing device may then transmit another request to deliver the order for the second price to a second driver.

14 Claims, 11 Drawing Sheets

(56) References Cited

U.S. PATENT DOCUMENTS

| | | | | |
|---|---|---|---|---|
| 2014/0278635 | A1* | 9/2014 | Fulton | G06Q 10/083 |
| | | | | 705/7.14 |
| 2016/0335593 | A1* | 11/2016 | Clarke | G06Q 10/0833 |
| 2017/0116566 | A1* | 4/2017 | Walton | G06Q 10/04 |
| 2017/0116696 | A1* | 4/2017 | Moore | G06Q 30/04 |
| 2017/0161860 | A1* | 6/2017 | Schultz | H04L 67/16 |
| 2018/0060774 | A1* | 3/2018 | Seaman | G06Q 10/06311 |
| 2018/0068269 | A1* | 3/2018 | Pillai | G06Q 10/08345 |
| 2018/0101877 | A1* | 4/2018 | Song | G01C 21/3492 |
| 2018/0165642 | A1* | 6/2018 | Krieg | G06Q 50/28 |
| 2019/0206008 | A1* | 7/2019 | Dutta | G06N 7/005 |
| 2019/0392390 | A1* | 12/2019 | Xu | G06Q 30/08 |
| 2020/0160251 | A1* | 5/2020 | Wynter | G06Q 10/063112 |
| 2020/0167812 | A1* | 5/2020 | Zhang | G06Q 30/0283 |

* cited by examiner

| DRIVER RANK | OFFER PRICE |
|---|---|
| 1 – 6 | $ 9.30 |
| 7 | $ 11.30 |
| 8 | $ 13.30 |
| 9 | $ 15.30 |
| 10 | $ 15.30 |
| FIRST POLL | $ 20.00 |
| LAST POLL | $ 25.00 |

FIG. 3B

METHOD AND APPARATUS FOR DELIVERY ORDER FEE DETERMINATION AND ASSIGNMENT

TECHNICAL FIELD

The disclosure relates generally to delivery services and, more specifically, to delivery management systems.

BACKGROUND

At least some retailers deliver purchased goods, such as groceries, to a customer. When an order is placed, the retailers must gather the purchased goods and schedule them for delivery. Some delivery management systems allow a customer to select a delivery window specifying a range of time when the goods may be delivered. Once scheduled, a delivery vehicle may collect the purchased goods for an order from a warehouse or store, and deliver the purchased goods to a customer at a specified delivery address, such as to the customer's home. Some delivery management systems allow delivery drivers to specify times when they are available for delivery. The delivery management systems may then assign deliveries with selected delivery windows that coincide with the times the delivery drivers are available to make deliveries.

These delivery management systems, however, have drawbacks. For example, sometimes there is a scarcity of drivers or, in some examples, no drivers that are willing to deliver items during a delivery window. As a result, the items may go undelivered, or they may be delivered at a later time than requested or expected. In some examples, customers may reject items because they are not being delivered on time. These and other drawbacks may lead retailers to suffer economic and reputational losses.

SUMMARY

The embodiments described herein may optimize delivery management systems and services by, for example, improving and/or ensuring on-time deliveries, reducing the number of undelivered orders, or more efficiently scheduling delivery vehicle drivers. As a result, a retailer employing one or more of these embodiments may be benefit by expending less effort and time in scheduling activities, more efficiently scheduling deliveries, and increasing the probability that a sufficient number of drivers are available to execute the deliveries. These and other benefits as recognized by those skilled in the art may lead to an improvement in customer service, reduction in time scheduling activities, and/or a reduction in delivery costs.

In some embodiments, a computing device is configured to obtain order data identifying an order for delivery. The computing device may transmit, to a first associate device associated with a first delivery vehicle, a first request to deliver the order for a first price. The computing device may determine that a response to the first request has not been received, and in response obtain at least one risk value corresponding to a delivery request acceptance risk factor. The computing device may determine a second price based on the first price and at least one of the obtained risk values. For example, the second price may be greater than the first price. The computing device may then transmit, to a second associate device associated with a second delivery vehicle, a second request to deliver the order for the second price. In some examples, if a response to the second request is not received, the computing device may transmit, to a plurality of associate devices, which may include the first associate device and the second associate device, a request to deliver the order for price greater than previously offered. The computing device may assign the order for delivery to the first responding associate device.

In some embodiments, a method is provided that includes obtaining order data identifying an order for delivery. The method may also include transmitting, to a first associate device associated with a first delivery vehicle, a first request to deliver the order for a first price. The method may also include determining that a response to the first request has not been received, and, in response, obtaining at least one risk value corresponding to a delivery request acceptance risk factor. The method may further include determining a second price based on the first price and at least one of the obtained risk values. For example, the second price may be greater than the first price. The method may include transmitting, to a second associate device associated with a second delivery vehicle, a second request to deliver the order for the second price. In some examples, if a response to the second request is not received, the method may include transmitting, to a plurality of associate devices, which may include the first associate device and the second associate device, a request to deliver the order for price greater than previously offered. The method may also include assigning the order for delivery to the first responding associate device.

In yet other embodiments, a non-transitory computer readable medium has instructions stored thereon, where the instructions, when executed by at least one processor, cause a device to perform operations that include obtaining order data identifying an order for delivery. The operations may also include transmitting, to a first associate device associated with a first delivery vehicle, a first request to deliver the order for a first price. The operations may also include determining that a response to the first request has not been received, and, in response, obtaining at least one risk value corresponding to a delivery request acceptance risk factor. The operations may further include determining a second price based on the first price and at least one of the obtained risk values. For example, the second price may be greater than the first price. The operations may include transmitting, to a second associate device associated with a second delivery vehicle, a second request to deliver the order for the second price. In some examples, if a response to the second request is not received, the operations may include transmitting, to a plurality of associate devices, which may include the first associate device and the second associate device, a request to deliver the order for price greater than previously offered. The operations may also include assigning the order for delivery to the first responding associate device.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 3B illustrates a surge pricing model that may be generated by the delivery management computing device of FIG. 1 in accordance with some embodiments;

DETAILED DESCRIPTION

Figure 1:
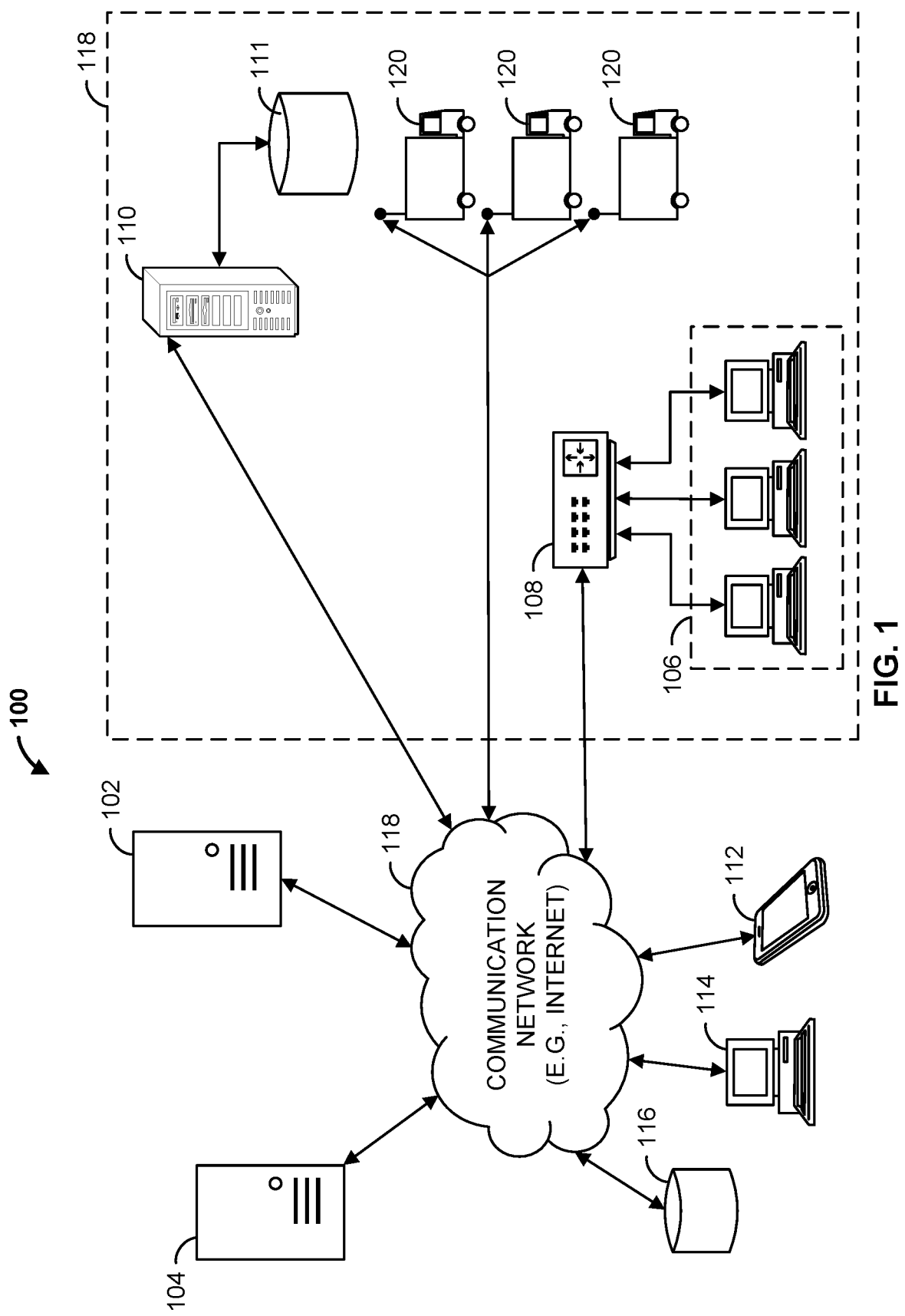
FIG. 1 is a block diagram of a delivery management system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a delivery management system 100 that includes a delivery management computing device 102 (e.g., a server, such as an application server), a web hosting device 104 (e.g., a web server), workstation(s) 106, database 116, scheduling server 110, and multiple customer computing devices 112, 114 operatively coupled over network 118. Delivery management system 100 may also include one or more delivery vehicles 120, which may be operated by delivery personnel. The delivery personnel may operate an associate device, which may be any suitable computing device, such as a mobile device, which may communicate over network 118. Delivery management computing device 102, web hosting device 104, workstation(s) 106, scheduling server 110, and multiple customer computing devices 112, 114 can each be any suitable computing device that includes any hardware or hardware and software combination for processing and handling information. In addition, each can transmit data to, and receive data from, communication network 118.

For example, each of delivery management computing device 102, web hosting device 104, workstation(s) 106, scheduling server 110, and multiple customer computing devices 112, 114 can be a computer, a workstation, a laptop, a mobile device such as a cellular phone, a web server, an application server, a cloud-based server, or any other suitable device. Each can include, for example, one or more processors, one or more field-programmable gate arrays (FPGAs), one or more application-specific integrated circuits (ASICs), one or more state machines, digital circuitry, or any other suitable circuitry.

Although FIG. 1 illustrates two customer computing devices 112, 114, delivery management system 100 can include any number of customer computing devices 112, 114. Similarly, delivery management system 100 can include any number of workstation(s) 106, 108, scheduling servers 110, delivery management computing devices 102, delivery vehicles 120, web hosting devices 104, and databases 116.

Communication network 118 can be a WiFi network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Delivery management computing device 102, web hosting device 104, workstation(s) 106, 108, and scheduling server 110 may be operated by a retailer. Customer computing devices 112, 114 may be computing devices operated by customers of a retailer. In some examples, web hosting device 104 hosts one or more web pages for the retailer. Each customer computing device 112, 114 may be operable to access the one or more webpages hosted by web hosting device 104 over communication network 118. For example, a customer operating a customer computing device 112, 114 may view a retailer's website hosted by web hosting device 104 as displayed by the customer computing device 112, 114, and may purchase products, such as goods or services, from the retailer's website by interacting with the website via the customer computing device 112, 114. The customer may also be able to request that the order be delivered. In some examples, scheduling server 110 is operable to schedule the orders for delivery with delivery vehicles 120. For example, upon receiving a request for the delivery of an order, scheduling server 110 may schedule the order to be delivered by a delivery associate operating delivery vehicle 120. The delivery associate may receive the request via a computing device, such as a mobile device. Scheduling server 110 is communicatively coupled to database 111, which may store scheduling data identifying the scheduled orders.

Workstation(s) 106, 108 may be operably coupled to communication network 118 via a router (or switch) 108. As such, workstation(s) 106, 108 can communicate with delivery management computing device 102 over communication network 118. For example, workstations(s) 106, 108 may transmit data, such as purchase order data, to delivery management computing device 102. Similarly, workstation(s) 106, 108 may receive data from delivery management computing device 102. Workstation(s) 106, 108 along with router 108 may be located at a retail location 118, such as a store or warehouse where purchased items are stored. Scheduling server 110 may also be located at retail location 118, and may schedule orders for delivery to be delivered from retail location 118 by delivery associates operating delivery vehicles 120.

Delivery management computing device 102 is operable to communicate with database 116 over communication network 118. For example, delivery management computing device 102 can store data to, and read data from, database 116. Database 116 may be a tangible, non-transitory memory. For example, database 116 may be a remote storage device, such as a cloud-based server, a memory device on another application server, a networked computer, or any other suitable remote storage. Although shown remote to delivery management computing device 102, in some examples, database 116 can be a local storage device, such as a hard drive, a non-volatile memory, or a USB stick. Database 116 may store purchase order data. For example, a customer may purchase good from a retailer's website hosted by web hosting device 104. Web hosting device 104 may store purchase order data identifying and characterizing the order in database 116. Delivery management computing device 102 may then obtain the purchase order data from database 116.

In some examples, delivery management computing device 102 may transmit a general timeslot availability request message that identifies one or more time slots for deliveries to one or more drivers of delivery vehicles 120 (via, e.g., scheduling server 110). Each general timeslot availability request message may identify a day, a time slot, and a base delivery price to be paid to the driver of the delivery vehicle 120. The time slot may be a range of time (e.g., 3-5 pm) on a particular day (e.g., Saturday). The driver of delivery vehicle 120 may accept or reject the general timeslot availability request. If a general timeslot availability request is rejected, by a first delivery vehicle 120, delivery management computing device 102 may transmit the general timeslot availability request to a second delivery vehicle 120.

If the general timeslot availability request is accepted, delivery management computing device 102 may receive one or more general timeslot availability responses accepting the request to deliver goods during the specified times. Upon working the scheduled delivery times (e.g., and delivering the scheduled delivery orders), the drivers are paid the base delivery price.

In some examples, if no, or not enough, drivers accept the request to deliver goods, delivery management computing device 102 may transmit a surged price timeslot availability request message that identifies one or more time slots, as well as a surged price (e.g., greater than the base price identified in the general timeslot availability request message), for deliveries to one or more drivers of delivery vehicles 120 (via, e.g., scheduling server 110). The surged price may be based on one or more risk factors as discussed further below. In response, delivery management computing device 102 may receive one or more surged price timeslot availability responses accepting the request to deliver goods during the specified times and for the surged price. Upon working the scheduled delivery times, the drivers are paid the surged price for the deliveries.

Delivery management computing device 102 may determine the surged price based on various risk factors affecting driver delivery acceptance rates (e.g., probability that drivers will accept a request for delivery services during a particular time slot on a particular day). The risk factors may include location based risk factors, delivery time risk factors, driver supply risk factors, and time deadline risk factors.

Location based risk may include, for example, driver acceptance risk associated with a particular area such as a market, a county, a zone, or a store location. Location based risk may also include driver acceptance risk associated with weather, special events, or any other location-based risk. Delivery time risk may include driver acceptance risk associated with the day and time of the week for the deliveries. Driver supply risk may include driver acceptance risk associated with a supply (e.g., availability) of drivers available for delivery services during a particular time slot. Driver supply risk may also include risk associated with historical driver behavior, such as acceptance rates or the amount of time taken for a driver to accept a delivery request. In some examples, driver supply risks include the ranking of a driver in a list. The driver rankings may be based on historical driver behavior such as acceptance rates, on-time delivery information, and customer ratings, for example. Time deadline risks may include driver acceptance risk associated with an amount of time left to find a driver before orders are to be delivered. These and other driver acceptance risks are described further below.

Each risk factor may be determined based on historical data, or projected data. In some examples, delivery management computing device 102 executes one or more linear, logarithmic, or polynomial equations to determine the surge price. In some examples, delivery management computing device 102 executes one or more machine learning algorithms to determine the risk factors. The machine learning algorithms may determine the risk factors based on historical scheduling data and/or real-time scheduling data. In some examples, each risk factor is weighted based on relevancy or importance.

In some examples, delivery management computing device 102 determines how many and/or which drivers to transmit timeslot availability request messages to. In some examples, delivery management computing device 102 modifies the surge price based on the number of drivers the timeslot availability request messages are transmitted to.

In some examples, delivery management computing device 102 determines a maximum surge price, a minimum surge price, and total driver payouts (e.g., per timeslot, per day, etc.). The maximum surge price may be a maximum price that is to be paid to a driver for delivery during a time slot, whereas the minimum surge price is a minimum price to be paid to the driver for delivery during the timeslot. For example, delivery management computing device 102 may transmit surged price timeslot availability request messages to one or more delivery vehicles 120 identifying a minimum surge price. Delivery management computing device 102 may wait a period of time for one or more surged price timeslot availability response messages accepting the requests. If no, or not enough, surged price timeslot availability response messages are received within the period of time (e.g., the delivery request expired), delivery management computing device 102 may generate an increased surged price, and transmit one or more surged price timeslot availability request messages with the increased surge price to one or more delivery vehicles 120. Delivery management computing device 102 may continue to increase the surged price periodically until either enough delivery vehicles 120 have accepted the requests, or until a delivery deadline time is reached. The delivery deadline time may be a minimum amount of time (e.g., 12 hours, a day) before the orders are to be delivered. If no, or not enough, delivery vehicles 102 accept the request by the delivery deadline time, delivery management computing device 102 may transmit a request for delivery of one or more of the orders to a third-party, such as a delivery company.

In some examples, delivery management computing device 102 determines surge prices in consideration of one or more payment rules. For example, delivery management computing device 102 determines surge prices that will satisfy (e.g., not violate) one or more payment rules. Payment rules may include rules that a retailer follows to assure that delivery drivers receive a fair share of delivery requests. For example, a payment rule may require that each drive is offered a minimum amount or percentage of delivery request offers. As another example, a payment rule may require that drivers with higher delivery request acceptance rates receive a higher amount or percentage of delivery request offers.

Figure 2:
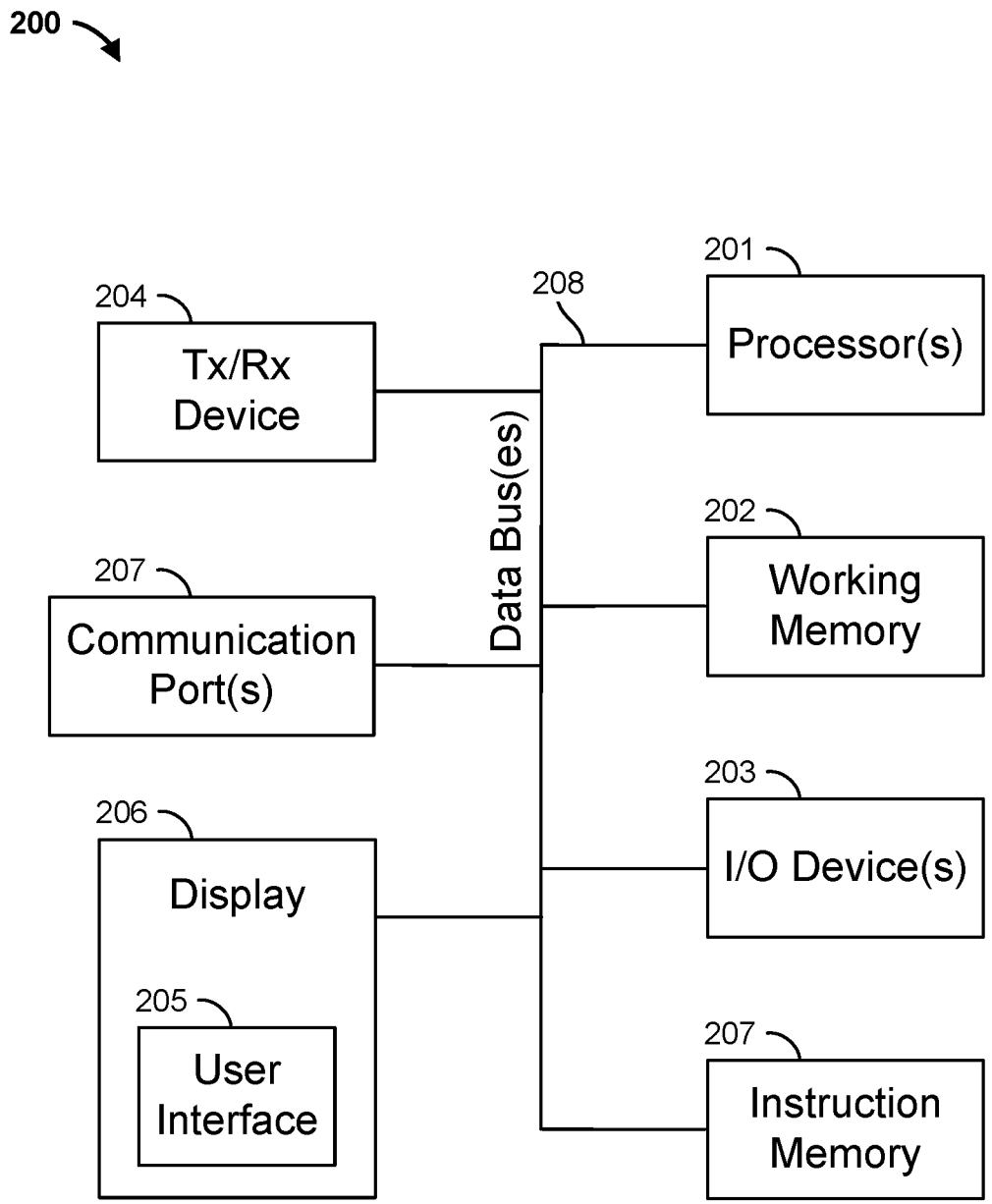
FIG. 2 is a block diagram of the delivery management computing device of FIG. 1 in accordance with some embodiments.

FIG. 2 illustrates an example of the delivery management computing device 102 of FIG. 1. Delivery management computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of delivery management computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as scheduling and surge pricing data.

Display 206 can display user interface 205. User interfaces 205 can enable user interaction with delivery management computing device 102. For example, user interface 205 can be a user interface for an application that allows for the viewing of semantic representations of user queries. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 delivery management computing device 102 will be operating in. Processor(s) 201 is operable to receive data from, or send data to, a network, such as communication network 118 of FIG. 1, via transceiver 204.

Figure 3A:
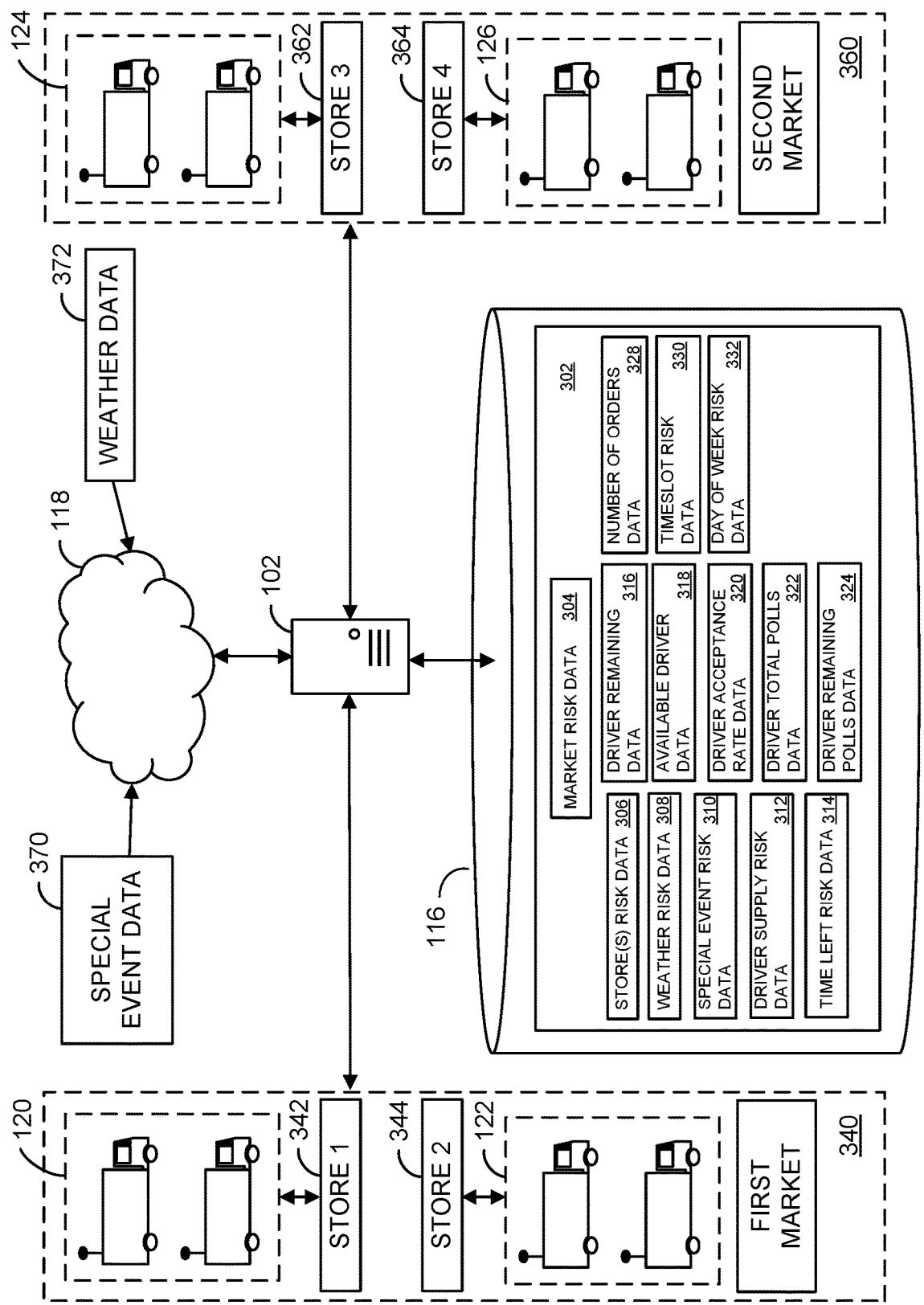
FIG. 3A illustrates a block diagram of various portions of the delivery management system of FIG. 1 including market risk data used to determine surge pricing in accordance with some embodiments.

FIG. 3A illustrates the delivery management computing device 102 of FIG. 1 in communication with multiple stores in multiple markets 340, 360. First market 340 incudes a first store 342 and a second store 344, and second market 360 includes a third store 362 and further store 364. Although only two stores are shown for each market, first market 340 and second market 360 may each include any number of stores. First store 342 is communicatively coupled to a plurality of delivery vehicles 120 (via, e.g., a scheduling server 110), and second store is communicatively coupled to a plurality of delivery vehicles 122. Third store 362 is communicatively coupled to a plurality of delivery vehicles 124 (via, e.g., a scheduling server 110), and fourth store is communicatively coupled to a plurality of delivery vehicles 126.

Each store may request driver availability for order deliveries from their corresponding delivery vehicles. For example, first store 342 may transmit general timeslot availability requests and surged price timeslot availability requests to delivery vehicles 120 and, in response, may receive general timeslot availability responses and surged price timeslot availability responses from delivery vehicles 120. Similarly, second store 344 may transmit general timeslot availability requests and surged price timeslot availability requests to delivery vehicles 122 and, in response, may receive general timeslot availability responses and surged price timeslot availability responses from delivery vehicles 122. Third store 362 may transmit general timeslot availability requests and surged price timeslot availability requests to delivery vehicles 124 and, in response, may receive general timeslot availability responses and surged price timeslot availability responses from delivery vehicles 124. Fourth store 364 may transmit general timeslot availability requests and surged price timeslot availability requests to delivery vehicles 126 and, in response, may receive general timeslot availability responses and surged price timeslot availability responses from delivery vehicles 126.

For each market, delivery management computing device 102 may generate risk factor data 302 that may be considered in determining surge prices. Risk factor data 302 may identify risk levels, such as percentages, associated with the underlying factor. In some examples, a table maps values of the underlying risk to corresponding risk levels. Risk factor data 302 may be stored in database 116, for example.

Risk factor data 302 may include market risk data 304, which may identify driver delivery acceptance rates for a particular market. The driver delivery acceptance rates may be based on a ratio of a number of drivers accepting delivery requests and the number of drivers that were sent delivery requests. Risk factor data 302 may also include store(s) risk data 306 for each store. Store risk data 306 may identify a driver acceptance rate for a particular store. In some examples, each of market risk data 304 and store(s) risk data 306 may identify driver acceptance rates for a particular period of time, such as for a day of the week, a month, a time range (e.g., 3-5 pm), or any other period of time. For example, one or more of market risk data 304 and store(s) risk data 306 may identify a driver acceptance rate for each day of the week.

Risk factor data 302 may also include weather risk data 308, and special even risk data 310. Weather risk data 308 may identify a risk level (e.g., a percentage) of there being adverse weather in a delivery area, such as a delivery area serviced by first store 342. Delivery management computing device 102 may generate weather risk data 308 periodically or, in some examples, in real-time, based on weather data 372 received from a weather service provider. The weather service provider may be any suitable service that provides weather data over a network, such as network 118.

Special event risk data 310 may identify a risk level associated with a special event that is taking place in or near a delivery area over a period of time. For example, the risk level identified by special event risk data 310 for a period of time may be higher if a special event, such as a sporting event or concert, is taking place during that period of time, than either after, or before, the special event takes place. Delivery management computing device 102 may generate special event risk data 310 periodically or, in some examples, in real-time, based on special event data 370 received from a provider of special event data. The provider of special event data may be any suitable provider, such as a provider that provides access to a networked calendar identifying special events.

Risk factor data 302 may also include time left risk data 314, which identifies a risk level associated with an amount of time left to find a driver before orders are to be delivered (e.g., delivery deadline time, as discussed above).

Risk factor data 302 may also include driver supply risk data 312, driver remaining data 316, available driver data 318, and driver acceptance rate data 320. Driver supply risk data 312 identifies a risk level associated with a supply (e.g., availability) of drivers available for delivery services during a particular time slot, such as on a particular day of the week, or during a deliver time slot (e.g., 5-7 pm). Driver supply risk data 312 may also identify a risk level associated with a driver ranking, such as the ranking of a driver in a ranked driver list.

Available driver data 318 identifies a risk level associated with a total number of drivers available for delivery during a particular timeslot, while driver remaining data 316 identifies a risk level associated with how many drivers out of a pool of drivers remain to request delivery availability from, such as during a particular timeslot.

For example, delivery management computing device 102 may request delivery availability (e.g., may transmit general timeslot availability requests and/or surged price timeslot availability requests) for a subset of drivers out of a pool of total drivers (e.g., drivers that have registered to deliver items for the retailer). The higher the number of total drivers, the lower the risk level identified by available driver data 318 (e.g., the more drivers, the less the risk associated with not having enough drivers to request delivery services from). If not enough drivers accept the requests (e.g., the delivery requests expired), delivery management computing device 102 may request delivery availability from another subset of drivers out of the pool of drivers (e.g., a subset of drivers that are different from the original subset of drivers).

In some examples, the subset of drivers is one. In other words, delivery management computing device 102 may request delivery availability of one driver at a time. For example, assume that customers placed twenty orders with a retailer via a website hosted by webserver 104, where each order is to be delivered on a particular day during a particular time period (e.g., Friday, between 5 pm-7 pm). Delivery management computing device 102 may determine that one driver can deliver the twenty orders within the time period, and may request driver availability from a first driver of a driver list (e.g., a list of ranked drivers servicing the delivery area where the orders are to be delivered). Assuming that driver does not respond to the request (e.g., the deliver request expired), delivery management computing device 102 may then request driver availability from the second driver on the ranked list. Delivery management computing device 102 may continue requesting drivers, one at a time, until the delivery request has been accepted.

In some examples, delivery management computing device 102 increases the surged price for each delivery request. For example, the first driver may be offered a base price (e.g., $9), the second driver may be offered a surged price that is higher than the base price (e.g., $12), and a third driver may be offered a surged price that is greater than the surged price offered to the second driver (e.g., $15). In some examples, a first number of drivers are offered the same price (e.g., the same base price). If enough drivers do not accept the requests, delivery management computing device 102 may offer a surged price to the next driver. Delivery management computing device 102 may then increase the surged price to each subsequent driver.

In some examples, delivery management computing device 102 requests driver availability for a same timeslot from a plurality of drivers at one time. For example, delivery management computing device 102 may determine that, based on the number of orders for delivery during a particular timeslot, multiple drivers are required to make the deliveries. Delivery management computing device 102 may request driver availability from a number of drivers on the ranked driver list required to make the deliveries. For example, if three drivers are required, delivery management computing device 102 may request driver availability from the top three ranked drivers. Based on a number of responses, delivery management computing device 102 may request driver availability from other drivers on the ranked list. For example, if one driver accepts, after the delivery requests have expired, delivery management computing device 102 may request from the next two drivers on the ranked list, i.e., the fourth and fifth drivers.

Risk factor data 302 may also include driver acceptance rate data 320, which identifies the delivery acceptance rates for various drivers. For example, driver acceptance rate data 320 may identify, for each driver, the percentage of general timeslot availability requests and/or surged price timeslot availability requests that have been accepted. In some examples, driver acceptance rate data 320 may identify an acceptance rate for each of multiple periods of time, such as during differing delivery timeslots, for each driver. Driver acceptance rate data 320 may also identify a risk level associated with a driver's acceptance position, such as an average acceptance position over a period of time. The acceptance position identifies the number the driver was to accept a delivery request. For example, if the driver was the third driver delivery management computing device 102 offered delivery services during a particular timeslot and the driver accepts, the acceptance position of the driver is three.

In some examples, delivery management computing device 102 transmits delivery requests to multiple drivers simultaneously (e.g., polls, or publishes to, the drivers), such as to all drivers registered with a retailer to deliver orders. The delivery requests may offer a surged price for delivery services during a particular timeslot. The surged price may be greater than any previously offered to an individual driver. For example, FIG. 3B illustrates example surge pricing requests. In this example, delivery management computing device 102 offers a delivery request with a base price 380, via a general timeslot availability request, for example, to a first driver of a ranked list. Assuming the first driver does not accept the delivery request (e.g., the request expired), delivery management computing device 102 offers the delivery request to the second driver of the ranked list at the same base price. Similarly, the delivery request is offered to the third, fourth, fifth, and sixth drivers of the ranked list at the same base price.

Continuing to assume that no drivers have accepted the request, delivery management computing device 102 offers the delivery request to the seventh driver at a surged price 382 via, for example, a surged price timeslot availability request. Assuming the seventh driver does not accept the request, delivery management computing device 102 may offer the delivery request to the eight driver of the ranked list at a surged price 384, then, assuming the eight driver did not accept the delivery request, to the ninth driver of the ranked list at a surged price 386 greater than that offered to the eight driver. Assuming the ninth driver does not accept the delivery request, the deliver request is offered to the tenth driver of the ranked list at a surged price 388, which is greater than the surged price offered to the ninth driver.

In some examples, if the tenth driver did not accept the delivery request, delivery management computing device 102 may execute a first poll 389 where all ten drivers receive a request for the delivery request at a surged price 390 greater than that offered to the tenth driver. If no drivers accept the delivery request, delivery management computing device 102 may execute a second (and, in this example, last) poll 391 where all ten drivers receive a request for the delivery request at an even higher surged price 390. If no drivers responds to the last poll 391, the deliveries may be assigned to a third-party for delivery. In some examples, if a driver does accept a delivery request conducted by poll, the first driver (or, if more than one driver is needed, the first number of drivers) to respond is awarded the deliveries.

Referring back to FIG. 3A, risk factor data 302 may include driver total polls data 322 identifying a risk level associated with a total number of polls to be offered during a particular timeslot, and driver remaining polls data 324 identifying a risk level associated with how many polls have yet to be executed. For example, the higher the total number of polls to be offered, the lower the risk level associated with driver total polls data 322 is. In addition, the risk level identified by driver remaining polls data 324 may be less if the first pool and last poll have not yet been conducted, compared to if the first poll has already been conducted Similarly, the higher the number of polls yet to be executed, the lower the risk level associated with driver remaining polls data 324 is.

Risk factor data 302 may also include number of orders data 328, timeslot risk data 330, and day of week risk data 332. The number of orders data 328 identifies a risk level with a number of orders that need to be delivered during a particular timeslot. For example, the more orders that need to be delivered during a particular timeslot, the higher the risk level identified by number of orders data 328. In some examples, delivery management computing device 102 generates a risk level based on a ratio of the supply of drivers available to deliver, and the number of orders for delivery, during a particular timeslot. Timeslot risk data 330 identifies a risk level with a particular timeslot, and day of week risk data 332 identifies a risk level associated with the day of the week for delivery.

Figure 4A:
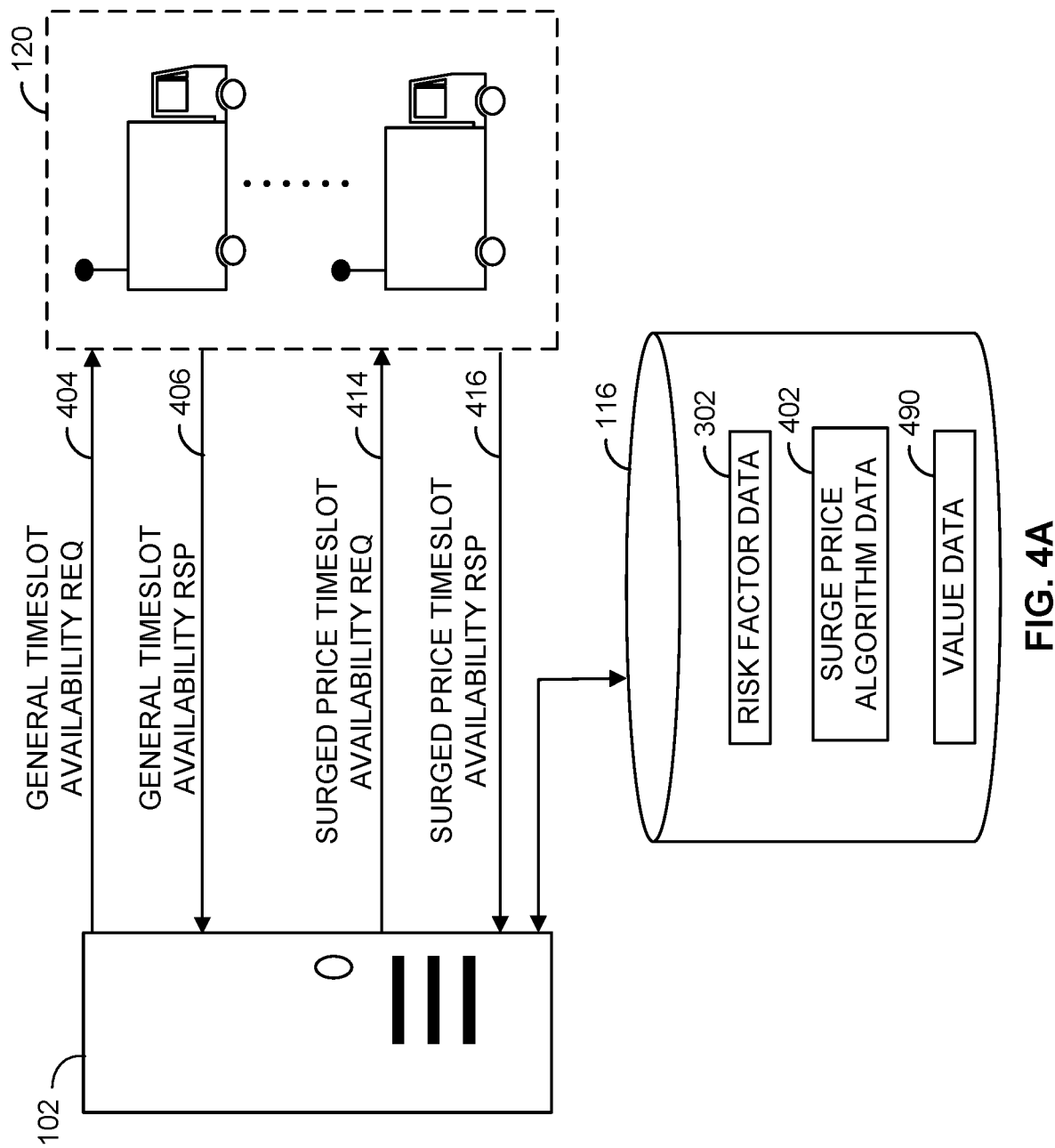
FIG. 4A illustrates a block diagram of portions of the delivery management system of FIG. 1 in accordance with some embodiments.

FIG. 4A illustrates delivery management computing device 102 in communication with a plurality of delivery vehicles 120. As illustrated, delivery management computing device 102 may transmit a general timeslot availability request 404 to one or more delivery vehicles 120. The general timeslot availability request 404 may identify a particular timeslot, and in some examples, a delivery price, which may be a base price. If delivery vehicle 120 wishes to accept the request, delivery vehicle 120 may respond with a general timeslot availability response 406. If, however, no, or not enough, delivery vehicles 120 accept general timeslot availability requests 406, delivery management computing device 120 may determine a surged price to offer for delivery services during the same timeslot. Delivery management computing device 102 may then transmit a surged price timeslot availability request 414 to the one or more delivery vehicles 120. If delivery vehicle 120 wishes to accept the request, delivery vehicle 120 may respond with a surged price timeslot availability response 416.

To determine the surged price, delivery management computing device 120 may execute one or more algorithms, such as linear, logarithmic, or polynomial algorithms. The algorithm may be identified and characterized by surge price algorithm data 402 stored in database 116, for example. The algorithm identified by surge price algorithm data 402 may determine a surged price based on risk factor data 302 and value data 490.

Figure 4B:
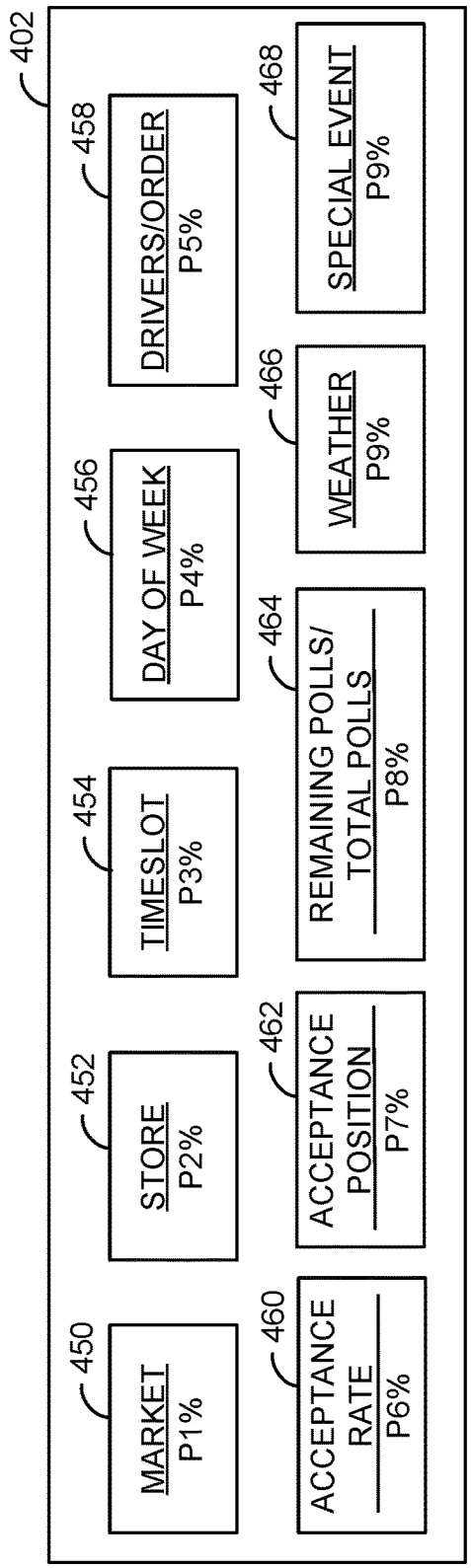
FIG. 4B illustrates portions of algorithm data that may be employed by the delivery management computing device of FIG. 4A in accordance with some embodiments.
Figure 4C:
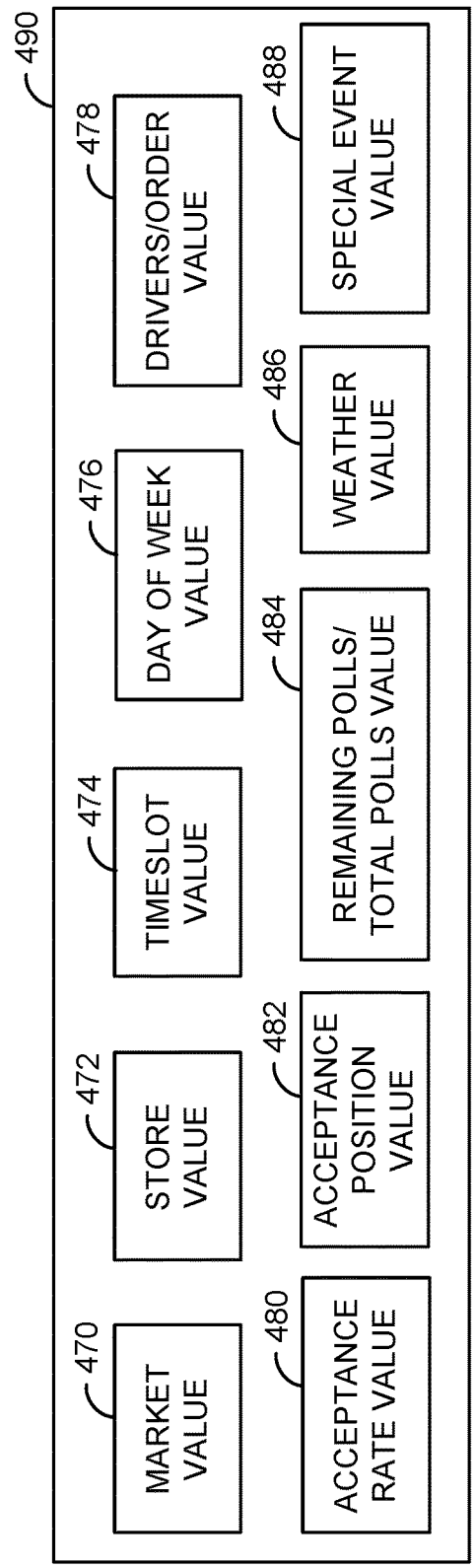
FIG. 4C illustrates portions of value data that may be employed by the delivery management computing device of FIG. 4A in accordance with some embodiments

Value data 490 identifies a value (e.g., price) that is associated with respective risk factors. Value data 90 may be generated based on historical driver acceptance data, such as previously accepted prices for deliveries. In some examples, value data 490 is empirically determined. Each value for each respective risk factor may be a portion of an overall surge value for deliveries during a particular timeslot. For example, as illustrated in FIG. 4C, value data 490 may include a market value 470 that identifies a value corresponding with market risk data 306. Similarly, store value 472 identifies a value corresponding with store risk data 306; timeslot value 474 identifies a value corresponding with timeslot risk data 330; day of week value 476 identifies a value corresponding with day of week risk data 332; drivers per order value 458 identifies a value corresponding to a number of drivers available per order, which may correspond with available driver data 318 and number of orders data 328; acceptance rate value 480 corresponds with driver acceptance rate data 320; acceptance position value 482 corresponds with driver supply risk data 312; remaining polls/total polls value 484 corresponds with driver total polls data 322 and driver remaining polls data 324; weather value 486 corresponds with weather risk data 308; and special event value 488 corresponds with special event risk data 310.

In some examples, the algorithm includes multiplying each value with its corresponding risk level to determine a risk price, such as in illustrated in equation 1 below:

$$\text{risk price}_n = \text{risk value}_n * \text{risk level}_n \quad \text{(eq. 1)}$$

In some examples, the algorithm includes a look up table (LUT) that identifies each risk price based on each corresponding value and risk level.

To determine the surged price, delivery management computing device 120 may combine (e.g., add) one or more of the risk prices. For example, the surged priced may be based on equation 2 below:

$$\text{surged price} = \sum_{n=1}^{N} \text{risk price}_n \quad \text{(eq. 2)}$$

In some examples, delivery management computing device 120 may apply a weighting to each risk price to determine the surged price. For example, FIG. 4B illustrates portions of surge price algorithm data 402 that identify weightings, or in this example, percentages, that are applied to risk prices. As illustrated, a percentage of P1% 450 is applied to market risk prices. Similarly, a percentage of P2% 452 is applied to store risk prices; a percentage of P3% 454 is applied to timeslot risk prices; a percentage of P4% 456 is applied to days of week risk prices; a percentage of P5% 458 is applied to drivers per order risk prices; a percentage of P6% 454 is applied to acceptance rate risk prices; a percentage of P7% 462 is applied to acceptance position risk prices; a percentage of P8% 462 is applied to remaining polls/total polls risk prices; a percentage of P9% is applied to weather risk prices; and a percentage of P10% is applied to special event risk prices. For example, delivery management computing device 120 may determine the surged price based on equation 3 below:

$$\text{surged price} = \sum_{n=1}^{N} (P_n * \text{risk price}_n) \quad \text{(eq. 3)}$$

As one example, the surged price, using equation 3 where "N" equals 13 (i.e., using 13 risk factors), may be computed as:

surged price=*P*1\*Market risk price+*P*2\*Store risk price+*P*3\*Timeslot risk price+*P*4\*Day of Week risk price+*P*5\*#Drivers/#Orders risk price+ *P*6\*Number of Available Drivers risk price+ *P*7\*Driver acceptance rate risk price+*P*8\*Driver acceptance position risk price+*P*9\*Driver Ranking risk price (e.g., based on On-time pick up, on-time deliveries, no shows, acceptance rates)+ *P*10\*Remaining Polls/Total Polls risk price+ *P*11\*Total Polls risk price(Input drivers/poll)+ *P*12\*Weather risk price+*P*13\*Special Event risk price;  (eq. 4)

Figure 5A:
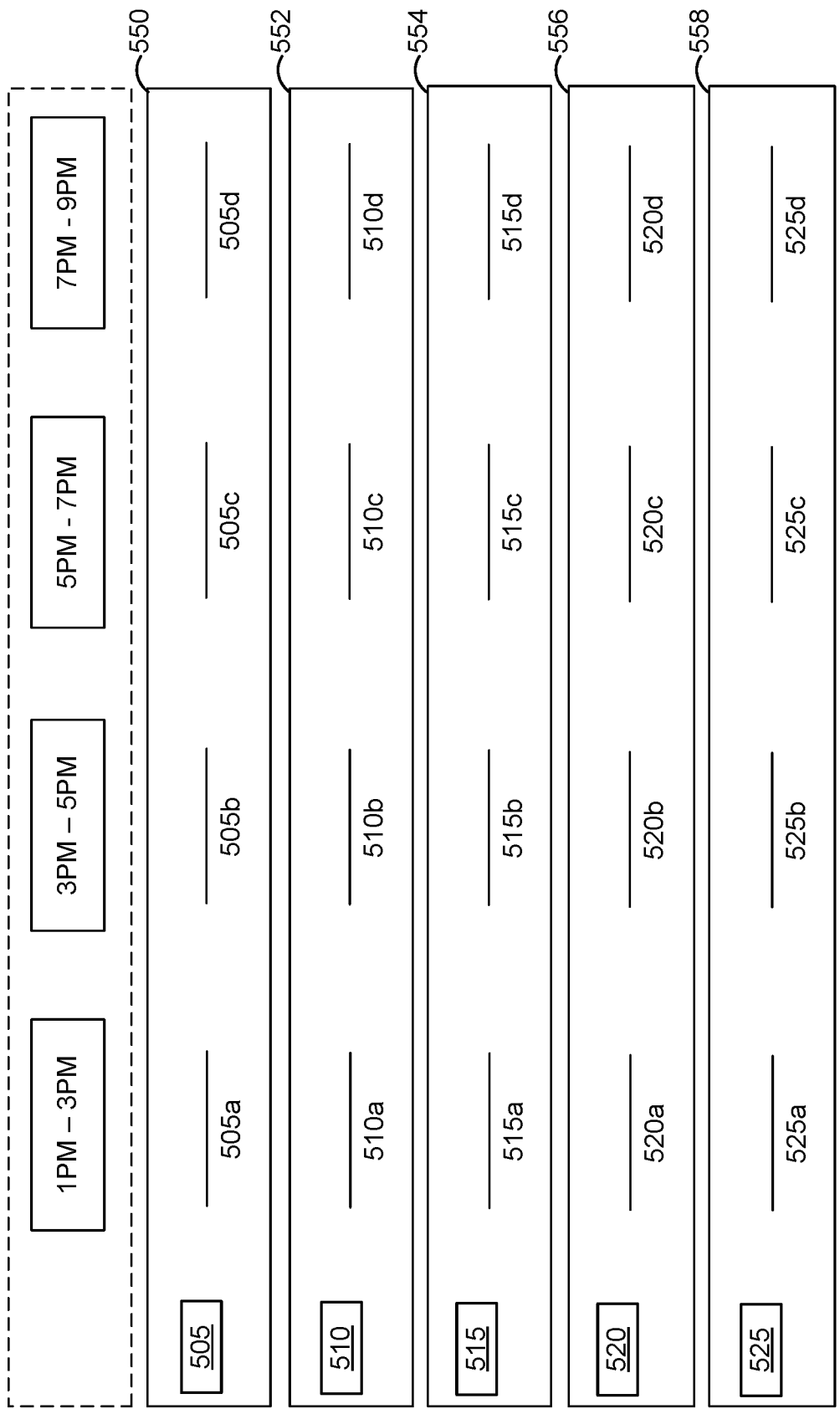
FIG. 5A illustrates a diagram of delivery vehicle timeslot requests in accordance with some embodiments.

FIG. 5A illustrates a plurality of general timeslot availability requests 550, 552, 554, 556, 558 which may be transmitted by delivery management computing device 102 to a computing device of drivers of corresponding delivery vehicles 505, 510, 515, 520, 525. Each general timeslot availability request 550, 552, 554, 556, 558 may be displayed, for example, by a display of the computing device. In this example, each general timeslot availability request 550, 552, 554, 556, 558 includes a number of timeslots that a driver may accept as being available to deliver orders, such as batched orders. For example, general timeslot availability request 550 includes timeslots 505a-505d. Timeslot request 505a is a request for delivery availability between the hours of 1 pm and 3 pm. Timeslot request 505b is a request for delivery availability between the hours of 3 pm and 5 pm, timeslot request 505c is a request for delivery availability between the hours of 5 pm and 7 pm, and timeslot request 505d is a request for delivery availability between the hours of 7 pm and 9 pm. Likewise, general timeslot availability request 552 includes timeslots 510a-510d, general timeslot availability request 554 includes timeslots 515a-515d, vehicle timeslot request 556 includes timeslots 520a-520d, and general timeslot availability request 558 includes timeslots 525a-525d.

General timeslot availability requests 550, 552, 554, 556, 558 may be transmitted to delivery vehicles 505, 510, 515, 520, 525 consecutively. In some examples, one general timeslot availability request 550, 552, 554, 556, 558 is transmitted to a corresponding delivery vehicle. Upon receiving a response or, in some examples, upon the expiration of a maximum amount of time (e.g., 15 minutes, an hour), a different vehicle timeslot request 550, 552, 554, 556, 558 may be transmitted to its corresponding delivery vehicle. Upon receiving a general timeslot availability request 550, 552, 554, 556, 558, a driver may accept (e.g., via the receiving computing device) one or more timeslots. The selection of a timeslot indicates that the delivery vehicle is available for deliveries during the corresponding timeslot.

Figure 5B:
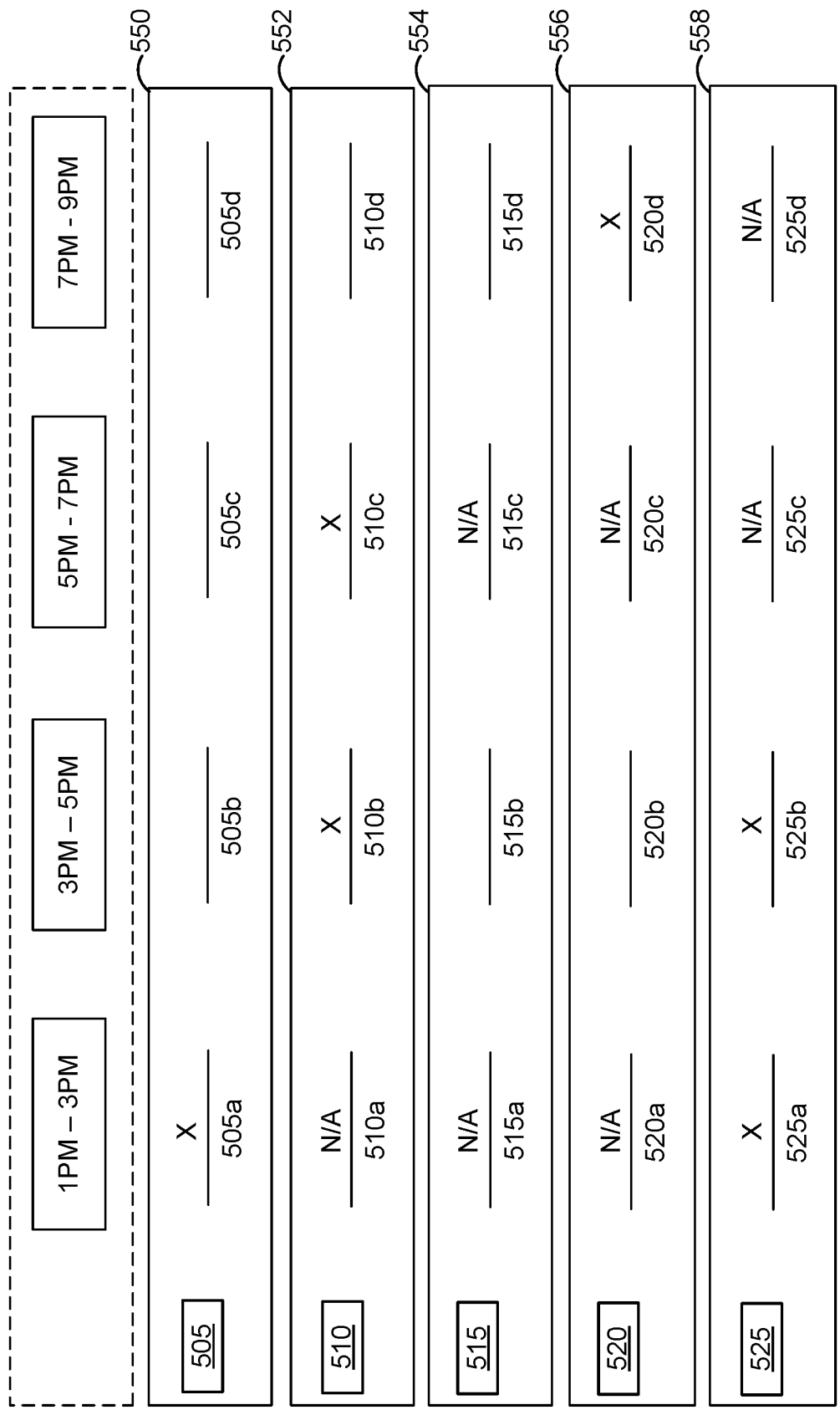
FIG. 5B illustrates a diagram of acceptances to the delivery vehicle timeslot requests of FIG. 5A in accordance with some embodiments.

For example, the driver of vehicle 505 may, upon receiving vehicle timeslot request 550, select one or more timeslots 505a-505d to indicate availability for deliveries during the selected timeslots. As illustrated in FIG. 5B, timeslot 505a has been selected for delivery vehicle 505. In this example, timeslot 510a for vehicle timeslot request 552 is not available, while timeslots 510b-510d are available. Timeslot 510a may not be available because, in some examples, the timeslot was already assigned to delivery vehicle 505. As illustrated, timeslots 510b and 510c have been selected.

General timeslot availability request 554 includes timeslots 515a and 515c with no availability (i.e., the timeslots may not be accepted) and timeslots 515b and 515d with availability. In this example, the driver of delivery vehicle 515 does not select any available timeslots. This may be, for example, because the driver is not available to make deliveries during the only available timeslots.

General timeslot availability request 556 is transmitted to delivery vehicle 520 and includes timeslots 520a and 520c with no availability and timeslots 520b and 520d with availability. For example, general timeslot availability request 556 may have been transmitted to delivery vehicle 520 because at least one timeslot 515a and 515c of general timeslot availability request 554 were not selected. The driver of delivery vehicle 520, in this example, selects timeslot 520d, but does not select timeslot 520b. In some examples, although timeslot 505a for general timeslot availability request 550 was selected, additional orders for delivery may have been received thereby requiring another driver during that same timeslot. Thus, general timeslot availability request 556 is transmitted with available timeslots 525a and 525b, but not availability during timeslots 525c and 525d. The driver for delivery vehicle 525 selects timeslots 525a and 525b. Upon selection of timeslots (via, e.g., a touchscreen display of the computing device), the computing device may transmit, to delivery management computing device 102, the selection of timeslots. For example, the selection of timeslots may be identified in a general timeslot availability response 406 message.

Figure 5C:
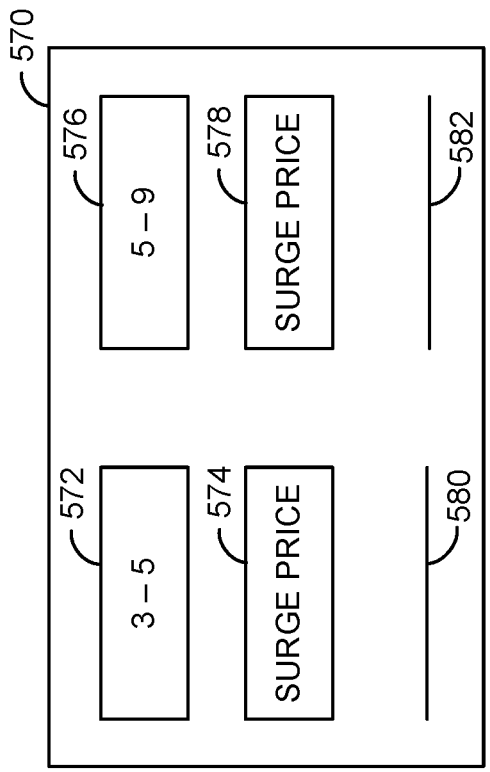
FIG. 5C illustrates a diagram of delivery vehicle timeslot requests with surged prices in accordance with some embodiments.
Figure 5D:
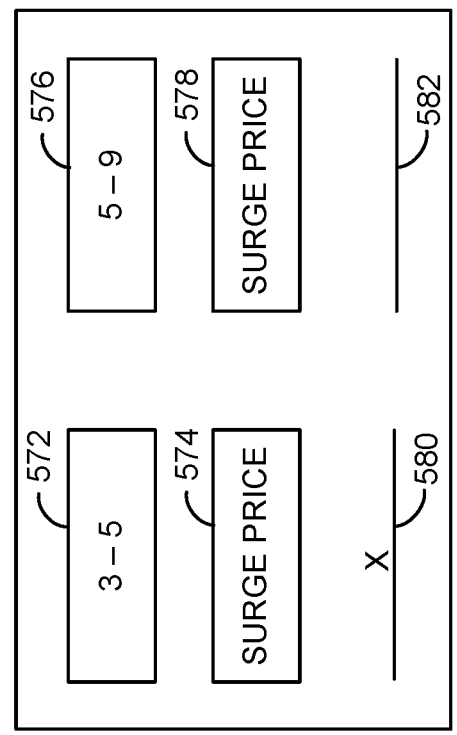
FIG. 5D illustrates a diagram of acceptances to the delivery vehicle timeslot requests with surged prices of FIG. 5C in accordance with some embodiments.

FIG. 5C illustrates an example of a surged price timeslot availability request 570. In this example, surged price timeslot availability request 570 identifies a timeslot 572 and corresponding surge price 574 for timeslot 572. surged price timeslot availability request 570 also identifies a timeslot 576 and corresponding surge price 578. A driver receiving surged price timeslot availability request 570 may accept one or more of the timeslots 572, 576 for delivery and, is to be paid the corresponding surge price for delivering the orders associated with each timeslot 572, 576. For example, FIG. 5D illustrates the selection on input line 580 of a request for delivery services during timeslot 572, while not accepting, as illustrated by unselected input line 582, the request for delivery services during timeslot 576.

Figure 6:
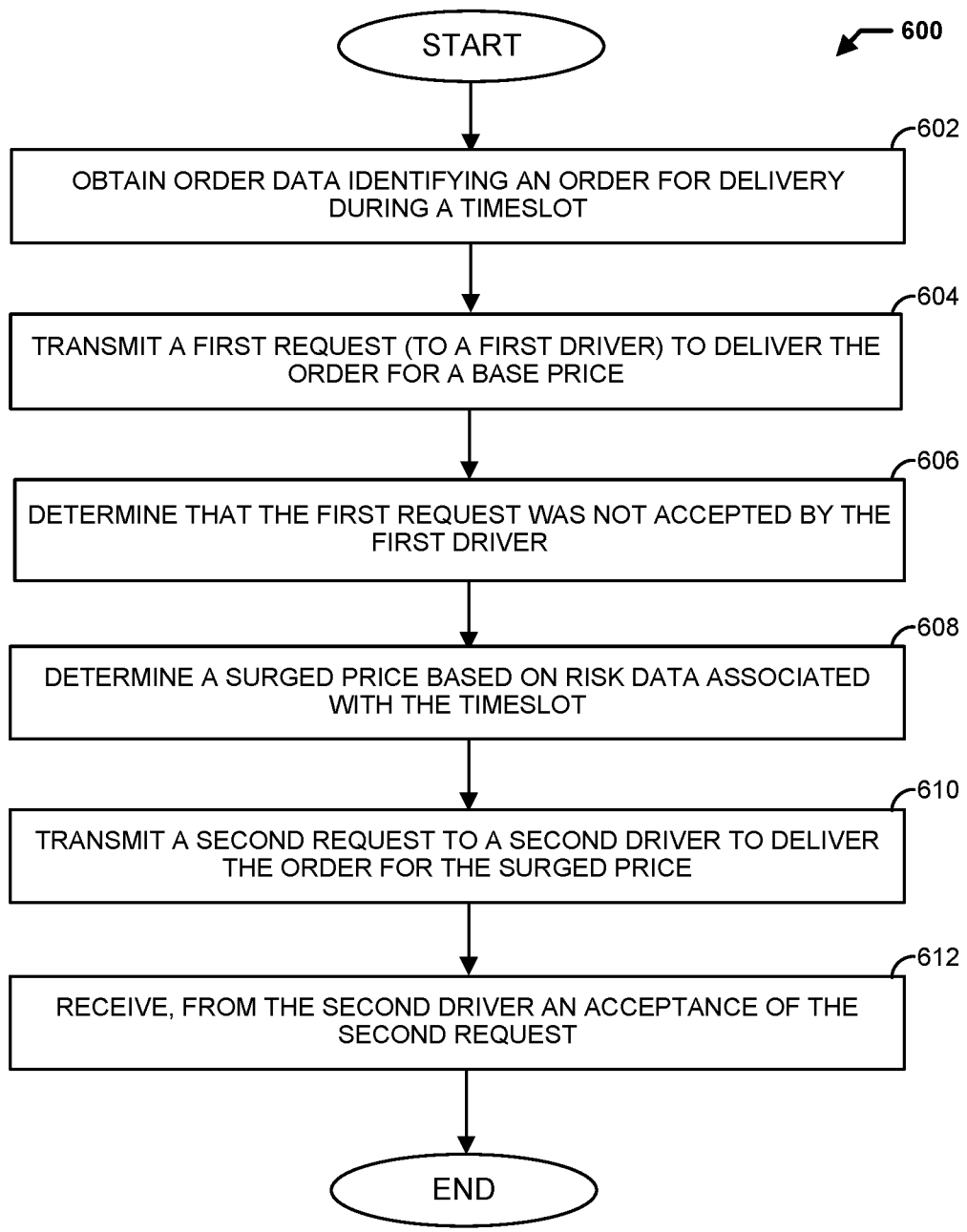
FIG. 6 is a flowchart of an example method that can be carried out by the delivery management computing device of FIG. 1 in accordance with some embodiments.

FIG. 6 is a flowchart of an example method 600 that can be carried out by, for example, the delivery management computing device 102 of FIG. 1. Beginning at step 602, order data identifying an order for delivery during a timeslot is obtained. For example, delivery management computing device 102 may obtain order data from web server 104, where a customer placed an online order for delivery. The order data may identify a date and time range for delivery of the order at a delivery address. At step 604, a first request to deliver the order for a base price is transmitted to a first driver. For example, delivery management computing device 102 may transmit a general timeslot availability request 404 message to a delivery vehicle 120. Proceeding to step 606, a determination is made that the first request was not accepted by the first driver. For example, the request may have expired (e.g., a response was not received within a maximum amount of time).

At step 608, a surged price is determined based on risk data associated with the timeslot. For example, the amount of the surged price may be based on risk data 302 including timeslot risk data 330. Proceeding to step 610, a second request is transmitted to a second driver, where the second request to deliver the order is for the surged price determined at step 608. For example, delivery management computing device 102 may transmit a surged price timeslot availability request 414 message to a delivery vehicle 120. At step 612, an acceptance to the second request is received from the second driver. For example, a surged price timeslot availability response 416 may be received in response to the surged price timeslot availability request 414. The second driver may be paid the surged price upon delivery of the order during the timeslot. The method then ends.

Figure 7:
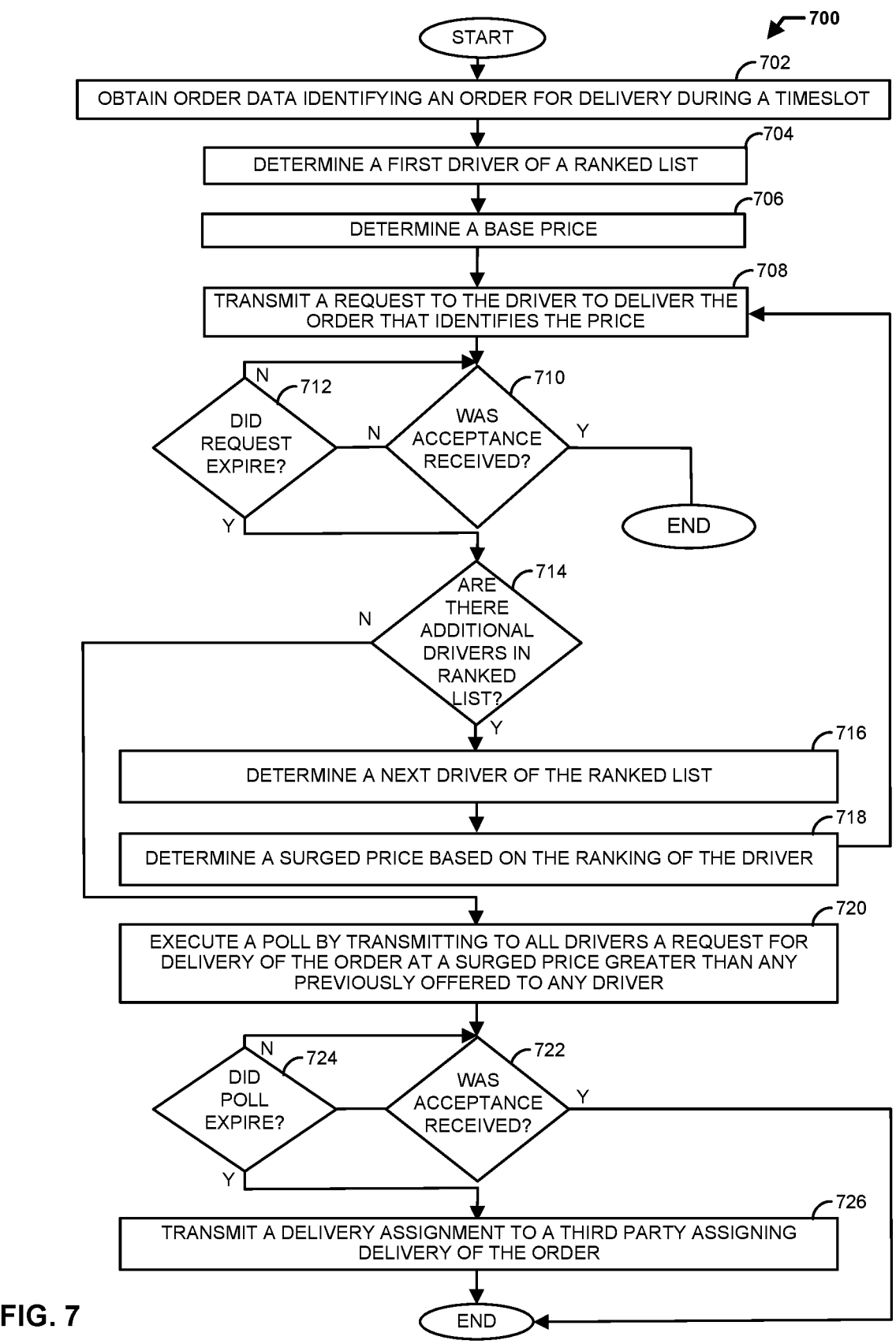
FIG. 7 is a flowchart of another example method that can be carried out by the delivery management computing device of FIG. 1 in accordance with some embodiments.

FIG. 7 is a flowchart of another example method 700 that can be carried out by, for example, the delivery management computing device 102 of FIG. 1. Beginning at step 702, order data identifying an order for delivery during a timeslot is obtained. For example, delivery management computing device 102 may obtain order data from web server 104, where a customer placed an online order for delivery. The order data may identify a date and time range for delivery of the order at a delivery address. At step 704, a first driver from a ranked list is determined. The ranked list may be based on, for example, historical data identifying driver acceptance rates, on-time deliveries, and no-show deliveries, for example. Once the first driver has been determined, at step 706 a base price is determined for delivery of the order.

Proceeding to step 708, a request is transmitted to the driver to deliver the order for the determined price. The request may be a general timeslot availability request 404 that identifies the base price, for example. At step 710, a determination is made as to whether an acceptance was received to the request. If an acceptance was received, the method ends. If, however, an acceptance has not yet been received, the method proceeds to step 712, where a determination is made as to whether the request has expired. For example, delivery management computing device 102 may determine if a maximum period of time has passed since transmission of the last request. If the request has not yet expired, the method proceeds back to step 710. Otherwise, if the request has expired, the method proceeds to step 714.

At step 714, a determination is made as to whether there are any additional drivers in the ranked list that have not yet been sent a delivery request. If there are any additional drivers remaining, the method proceeds to step 716, where the next driver of the ranked list is determined. For example, the next driver of the ranked list may be the highest ranked driver remaining. From step 716, the method proceeds to step 718, where a surged price is determined based on the ranking of the order. For example, delivery management computing device 102 may determine the surged price based on driver acceptance rate data 320. The method then proceeds back to step 708, where a request is transmitted to the next driver to deliver the order. For example, delivery management computing device 102 may transmit to the next driver a surged price timeslot availability request 414 message that identifies the surged price determined at step 718.

Back at step 714, if there are no additional drivers remaining in the ranked list that have not been sent a delivery request, the method proceeds to step 720. At step 720, a poll is executed that includes transmitting, to all drivers, a request for delivery of the order at a surged price that is greater than any previously offered to any driver. For example, the surged price determined at this step is greater than any price determined at step 706 and 718. The method then proceeds to step 722, where a determination as to whether an acceptance was received is made. For example, delivery management computing device 102 may determine whether any surged price timeslot availability response 416 has been received from any driver. If a response has been received, the method ends. Otherwise, if no responses have been received, the method proceeds to step 724, where a determination as to whether the poll expired is made. For example, delivery management computing device 102 may determine whether a maximum amount of time since the poll transmissions were sent has elapsed. If the poll has not expired, the method proceeds back to step 722 to determine if an acceptance is received. If the poll did expire, however, the method proceeds to step 726. At step 726, a delivery assignment is transmitted to a third party, such as a delivery company, assigning the delivery of the order. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a non-transitory memory comprising order data identifying an order regarding a first market for delivery and a timeslot associated with the order;
   a transceiver; and
   a processor in data communication with the non-transitory memory and the transceiver, the processor configured to:
   obtain, from the non-transitory memory, the order data;
   transmit, via the transceiver and to a first associate device of a first driver of a plurality of drivers, a first request to deliver the order for a first price;
   determine that the first request has not been accepted;
   determine an acceptance rate of the first driver and an order risk, wherein the acceptance rate is based on a number of requests, of a plurality of previously transmitted requests, that were accepted by the first driver, and wherein the order risk is based on an amount of the plurality of drivers, an amount of a plurality of orders for delivery, a number of orders to be delivered during the timeslot, and a total number of polls to be offered during the timeslot;
   train a machine learning model based on data related to the first market;
   obtain, from a database, historical scheduling data associated with a plurality of associate devices;
   input the historical scheduling data into the trained machine learning model to determine a plurality of first risk factors each associated with a corresponding first weight, wherein the plurality of first risk factors comprises: driver acceptance risk data, third-party risk data, the acceptance rate, and the order risk;
   determine a risk price for the order, wherein the risk price is determined by aggregating individual risk prices for each of the plurality of first risk factors based on the corresponding first weight, wherein each individual risk price is obtained from a lookup table stored in the non-transitory memory, wherein the lookup table stores corresponding risk prices based on a corresponding risk value and a risk level for each respective first risk factor;
   determine a second price based on the first price and the risk price, wherein the second price is determined by applying at least one weighting to the risk price, and wherein the at least one weighting is associated with a surge price algorithm stored in the non-transitory memory;
   transmit, via the transceiver and to a second associate device, a second request to deliver the order for the second price, wherein the first associate device and the second associate device are determined based on a ranked list;
   responsive to determining the second request has not been accepted and no associate devices are remaining in the ranked list, poll a plurality of associate devices to deliver the order for a surge price, wherein the surge price is greater than the second price, wherein the plurality of associate devices includes at least one of the first associate device or the second associate device, and wherein the polling is transmitted to each of the plurality of associate devices simultaneously;
   responsive to receiving one or more responses to the simultaneous polling, assign the order for delivery to a first responding one of the plurality of associate devices;
   responsive to determining a maximum time for the polling has elapsed without receiving a response from the plurality of associate devices, transmit a delivery assignment for the order to a third-party delivery system;
   update the driver acceptance risk data to generate updated scheduling data associated with the plurality of associate devices based on acceptance of the order by one of the first associate device, the second associate device, one of the plurality of associate devices, or the third-party delivery system;
   obtain second order data identifying a second order regarding a second market for delivery;
   re-train the trained machine learning model based on data related to the second market;
   input the updated scheduling data into the re-trained machine learning model to determine a plurality of second risk factors each associated with a corresponding second weight, wherein the plurality of second risk factors are different from the plurality of first risk factors;
   determine a second risk price for the second order, wherein the second risk price is determined by aggregating individual risk prices for each of the plurality of second risk factors based on the corresponding second weight; and
   assign the second order to one of the plurality of associate devices or the third-party delivery system based on the second risk price.

2. The system of claim 1, where the processor is configured to receive a response, via the transceiver, to the second request from the second associate device.

3. The system of claim 1, wherein the acceptance rate is based on historical delivery acceptance rates for the timeslot.

4. The system of claim 1, wherein the at least one risk value comprises a first risk value that is based on a driver supply risk factor and a second risk factor that is based on an amount of time remaining to assign the order, wherein the processor is configured to determine the second price based on the first price, the first risk value, and the second risk value.

5. The system of claim 1, wherein the ranked list identifies a ranking of delivery associates, wherein the second associate device is associated with a second associate of the ranked list, and wherein the processor is configured to determine the second price based on the ranking of the second associate in the ranked list.

6. The system of claim 1, wherein the processor is configured to:
  determine that a maximum amount of time has passed since the transmission of the first request; and
  determine that the first request has not been accepted based on determining that the maximum amount of time has passed since the transmission of the first request.

7. The system of claim 1, wherein the second request identifies the timeslot to deliver the order.

8. The system of claim 1, wherein the at least one risk value comprises a first risk value that is based on a weather risk factor and a second risk value that is based on a special event risk factor, wherein the processor is configured to determine the second price based on the first risk value and the second risk value.

9. The system of claim 1, where the processor is configured to:
  execute a machine learning algorithm that operates on historical scheduling data stored within a database to determine a plurality of risk factors;
  applying a corresponding weight to each of the plurality of risk factors; and
  generating the lookup table including the weighted plurality of risk factors; and
  storing the lookup table in the non-transitory memory.

10. The system of claim 1, wherein the processor is a first a processor, and further comprising:
  a second processor in data communication with the non-transitory memory, wherein the second processor is configured to:
    receive the order data from a user system, wherein the order data is indicative of an order placed by the user system via a website; and
    store the order data in the non-transitory memory.

11. A method comprising:
  obtaining, by a processor, order data identifying an order regarding a first market for delivery and a timeslot, wherein the order data is stored in a database in data communication with the processor;
  transmitting, via the transceiver and to a first associate device of a first driver of a plurality of drivers, a first request to deliver the order for a first price;
  determining, by the processor, that the first request has not been accepted;
  determining, by the processor, an acceptance rate of the first driver and an order risk, wherein the acceptance rate is based on a number of requests, of a plurality of previously transmitted requests, that were accepted by the first driver, and wherein the order risk is based on an amount of the plurality of drivers, an amount of a plurality of orders for delivery, a number of orders to be delivered during the timeslot, and a total number of polls to be offered during the timeslot;
  training a machine learning model based on data related to the first market;
  obtaining historical scheduling data associated with a plurality of associate devices;
  inputting the historical scheduling data into the trained machine learning model to determine a plurality of first risk factors each associated with a corresponding first weight, wherein the plurality of first risk factors comprises: driver acceptance risk data, third-party risk data, the acceptance rate, and the order risk;
  obtaining, by the processor, a risk price for the order, wherein the risk price is determined by aggregating individual risk prices for each of the plurality of first risk factors based on the corresponding first weight, wherein each individual risk price is obtained from a lookup table stored in the non-transitory memory, wherein the lookup table stores corresponding risk prices based on a corresponding risk value and a risk level for each respective first risk factor;
  determining, by the processor, a second price based on the first price and the risk price, wherein the second price is determined by applying at least one weighting to the risk price, and wherein the at least one weighting is associated with a surge price algorithm stored in the non-transitory memory;
  transmitting, via the transceiver, to a second associate device, a second request to deliver the order for the second price, wherein the first associate device and the second associate device are determined based on a ranked list;
  responsive to determining the second request has not been accepted and no associate devices are remaining in the ranked list, polling, by the processor, a plurality of associate devices to deliver the order for a surge price, wherein the surge price is greater than the second price, wherein the plurality of associate devices includes at least one of the first associate device or the second associate device, and wherein the polling is transmitted to each of the plurality of associate devices simultaneously;
  responsive to receiving one or more responses to the simultaneous polling, assigning the order for delivery to a first responding one of the plurality of associate devices;
  responsive to determining a maximum time for the polling has elapsed without receiving a response from the plurality of associate devices, transmitting, via the transceiver, a delivery assignment for the order to a third-party delivery system;
  updating the driver acceptance risk data to generate updated scheduling data associated with the plurality of associate devices based on acceptance of the order by one of the first associate device, the second associate device, or the third-party delivery system;
  obtaining second order data identifying a second order regarding a second market for delivery;
  re-training the trained machine learning model based on data related to the second market;
  inputting the updated scheduling data into the re-trained machine learning model to determine a plurality of second risk factors each associated with a corresponding second weight, wherein the plurality of second risk factors are different from the plurality of first risk factors;
  determining a second risk price for the second order, wherein the second risk price is determined by aggregating individual risk prices for each of the plurality of second risk factors based on the corresponding second weight; and
  assigning the second order to one of the plurality of associate devices or the third-party delivery system based on the second risk price.

12. The method of claim 11 further comprising receiving a response to the second request from the second associate device.

13. A non-transitory computer readable medium having instructions stored thereon, wherein the instructions, when executed by at least one processor, cause a device to perform operations comprising:

obtaining, by a processor, order data identifying an order regarding a first market for delivery and a timeslot, wherein the order data is stored in a database in data communication with the processor;

transmitting, via the transceiver and to a first associate device of a first driver of a plurality of drivers, a first request to deliver the order for a first price;

determining, by the processor, that the first request has not been accepted;

determining, by the processor, an acceptance rate of the first driver and an order risk, wherein the acceptance rate is based on a number of requests, of a plurality of previously transmitted requests, that were accepted by the first driver, and wherein the order risk is based on an amount of the plurality of drivers, an amount of a plurality of orders for delivery, a number of orders to be delivered during the timeslot, and a total number of polls to be offered during the timeslot;

training a machine learning model based on data related to the first market;

obtaining historical scheduling data associated with a plurality of associate devices;

inputting the historical scheduling data into the trained machine learning model to determine a plurality of first risk factors each associated with a corresponding first weight, wherein the plurality of first risk factors comprises: driver acceptance risk data, third-party risk data, the acceptance rate, and the order risk;

obtaining, by the processor, a risk price for the order, wherein the risk price is determined by aggregating individual risk prices for each of the plurality of first risk factors based on the corresponding first weight, wherein each individual risk price is obtained from a lookup table stored in the non-transitory memory, wherein the lookup table stores corresponding risk prices based on a corresponding risk value and a risk level for each respective first risk factor;

determining, by the processor, a second price based on the first price and the risk price, wherein the second price is determined by applying at least one weighting to the risk price, and wherein the at least one weighting is associated with a surge price algorithm stored in the non-transitory memory;

transmitting, via the transceiver, to a second associate device, a second request to deliver the order for the second price, wherein the first associate device and the second associate device are determined based on a ranked list;

responsive to determining the second request has not been accepted and no associate devices are remaining in the ranked list, polling, by the processor, a plurality of associate devices to deliver the order for a surge price, wherein the surge price is greater than the second price, wherein the plurality of associate devices includes at least one of the first associate device or the second associate device, and wherein the polling is transmitted to each of the plurality of associate devices simultaneously;

responsive to receiving one or more responses to the simultaneous polling, assigning the order for delivery to a first responding one of the plurality of associate devices;

responsive to determining a maximum time for the polling has elapsed without receiving a response from the plurality of associate devices, transmitting, via the transceiver, a delivery assignment for the order to a third-party delivery system;

updating the driver acceptance risk data to generate updated scheduling data associated with the plurality of associate devices based on acceptance of the order by one of the first associate device, the second associate device, or the third-party delivery system;

obtaining second order data identifying a second order regarding a second market for delivery;

re-training the trained machine learning model based on data related to the second market;

inputting the updated scheduling data into the re-trained machine learning model to determine a plurality of second risk factors each associated with a corresponding second weight, wherein the plurality of second risk factors are different from the plurality of first risk factors;

determining a second risk price for the second order, wherein the second risk price is determined by aggregating individual risk prices for each of the plurality of second risk factors based on the corresponding second weight; and assigning the second order to one of the plurality of associate devices or the third-party delivery system based on the second risk price.

14. The non-transitory computer readable medium of claim 13 further comprising instructions stored thereon that, when executed by at least one processor, further cause the device to perform operations comprising:

receiving a response to the second request from the second associate device.

\* \* \* \* \*